(12) United States Patent
Mathew et al.

(10) Patent No.: US 10,581,637 B2
(45) Date of Patent: Mar. 3, 2020

(54) COMPUTATIONAL NODE ADAPTIVE CORRECTION SYSTEM

(71) Applicant: PayPal, Inc., San Jose, CA (US)

(72) Inventors: Suresh Mathew, Sunnyvale, CA (US); Krishnakanth Batta, San Jose, CA (US); Vaibhav Desai, San Jose, CA (US); Shankar Jothi, San Jose, CA (US); Jigar Chandrakant Desai, Fremont, CA (US); Muthukumar Rethinakaleeswaran, San Jose, CA (US); Rami El-Charif, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 305 days.

(21) Appl. No.: 15/447,012

(22) Filed: Mar. 1, 2017

(65) Prior Publication Data

US 2017/0257297 A1 Sep. 7, 2017

Related U.S. Application Data

(60) Provisional application No. 62/301,957, filed on Mar. 1, 2016.

(51) Int. Cl.
*H04L 12/26* (2006.01)
*H04L 12/46* (2006.01)
*H04L 12/24* (2006.01)
*H04L 29/08* (2006.01)

(52) U.S. Cl.
CPC ...... *H04L 12/4641* (2013.01); *H04L 41/0681* (2013.01); *H04L 41/0893* (2013.01); *H04L 41/12* (2013.01); *H04L 43/04* (2013.01); *H04L 43/08* (2013.01); *H04L 43/0817* (2013.01); *H04L 43/10* (2013.01); *H04L 41/0686* (2013.01); *H04L 67/1002* (2013.01)

(58) Field of Classification Search
CPC ........ H04L 43/04; H04L 43/08; H04L 43/085
See application file for complete search history.

(56) References Cited

U.S. PATENT DOCUMENTS

| | | | |
|---|---|---|---|
| 6,393,483 B1 * | 5/2002 | Latif | H04L 41/0668 370/230 |
| 6,502,132 B1 * | 12/2002 | Kumano | H04L 43/065 709/224 |
| 9,742,639 B1 * | 8/2017 | Zhang | H04L 41/0853 |

(Continued)

*Primary Examiner* — Jeong S Park
(74) *Attorney, Agent, or Firm* — Maschoff Brennan

(57) ABSTRACT

A system and method for adaptively identifying and correcting issues in a computing system, such as a distributed node computing system, are described. The method includes receiving node data from a group of nodes, the node data describing one or more operational characteristics of a node. The operational characteristics may include CPU load, memory load, latency, or other operational data that describes node performance. Reachability data for the group of nodes is generated by trying to contact each node. Code version data is generated for each node that identifies which version of code applications in the node are running. The nodes are grouped into clusters using density-based clustering to identify outliers. A correlation is determined between the reachability, code version, and outlier data to identify problems and issue corrective actions.

20 Claims, 9 Drawing Sheets

(56) References Cited

U.S. PATENT DOCUMENTS

| | | | |
|---|---|---|---|
| 9,817,864 B1 * | 11/2017 | Dunagan | G06F 16/245 |
| 9,864,636 B1 * | 1/2018 | Patel | G06F 9/5061 |
| 2003/0033550 A1 * | 2/2003 | Kuiawa | G06F 3/04817 |
| | | | 713/340 |
| 2008/0049641 A1 * | 2/2008 | Edwards | H04L 12/66 |
| | | | 370/253 |
| 2014/0136682 A1 * | 5/2014 | Lukas | G06F 11/3495 |
| | | | 709/224 |
| 2015/0188731 A1 * | 7/2015 | Daly | H04L 41/12 |
| | | | 709/224 |

\* cited by examiner

COMPUTATIONAL NODE ADAPTIVE CORRECTION SYSTEM

CROSS-REFERENCE TO RELATED APPLICATIONS

This application claims priority to and the benefit of U.S. Provisional Patent Application Ser. No. 62/301,957, filed on Mar. 1, 2016; the disclosure of this application is incorporated by reference herein.

TECHNICAL FIELD

The present application relates generally to the technical field of distributed computing systems and, in various embodiments, to systems and methods of adaptively identifying and correcting issues in a distributed computing system.

BACKGROUND

Cloud-based infrastructures manage myriads of applications that require different parameters to operate correctly. Ensuring each application stays up (e.g., keeps running) can require constant attention from network administrators. Current approaches for automating issue correction of nodes cannot efficiently scale with the cloud-infrastructure as the cloud-infrastructure grows. Worse yet, as the number and types of new applications deployed in the cloud-based infrastructure evolve over time, an issue correction system must be constantly updated to correctly monitor the health of new applications, new hardware, and new requirements. As a result, cloud-based infrastructures may suffer scaling and issue correction difficulties.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
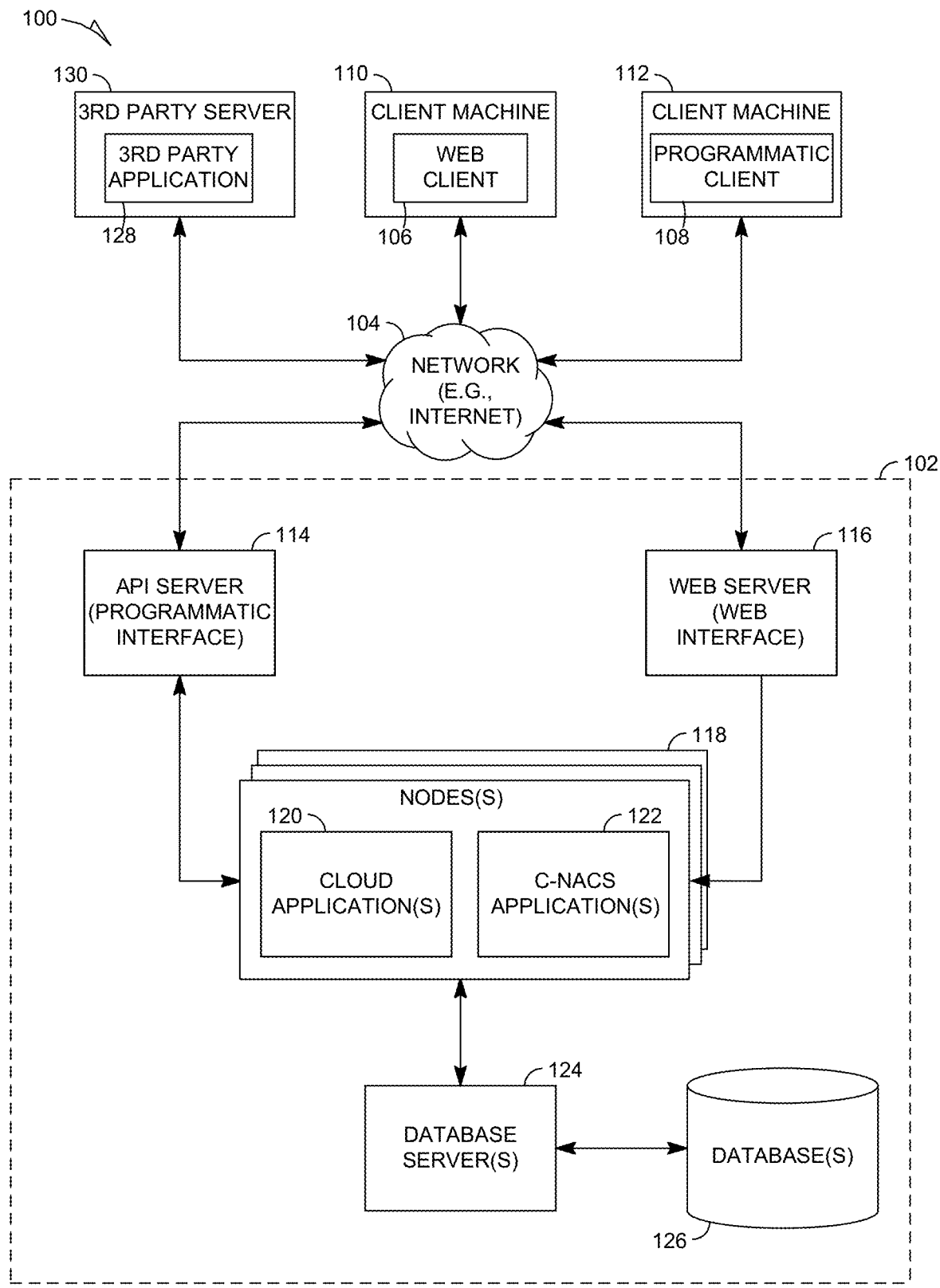
FIG. 1 is a network diagram depicting a client-server system, within which one example embodiment may be deployed.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods of adaptively correcting issues in a distributed computing system. As cloud-based infrastructures become more common for providing applications, systems to manage cloud applications have struggled to keep pace. Some cloud-based infrastructures implement clusters of computing nodes, where each node may be implemented as a virtual machine or virtual server. Each node may run a plurality of applications that provide web-services to clients over a network, such as the Internet. As the use of cloud-based infrastructure grows, the number and types of errors presents new issues that require custom or manual fixes by network administrators. The manual fixes can create downtime and further presents scaling issues, as the number of manual fixes and number of network administrators are typically limited.

To address these issues, a management system can be implemented that monitors each node and applications running on each node. Things monitored may include: the reachability of a node, the version of code that applications are running for a node, and whether or not a given node is an outlier of a cluster as indicated by runtime metrics.

Briefly, the reachability of a node is indicative of whether or not the node is responsive to communications from other computing entities or users. For example, if a user pings a node or telnets the node, and the node does not respond, the node may be unreachable. This in turn may be indicative that the node or applications on the node have frozen and should be restarted or replaced. As an example concerning code versions, when applications are deployed they are running code of a certain code version that should be up-to-date. However, errors in the application after deployment can cause the code version run in a node to be different than what it should be. Accordingly, the management system can query the node or applications running on the node to determine whether the code versions of code running on the node are what they should be. If the code versions are incorrect, the management system can replace the node (e.g., format the node computer, replace the node VM) or replace applications on the node. For an example concerning runtime metrics, each node in a cluster may be monitored for specified runtime metrics, which are operational characteristics of applications running on the node (e.g., response time), or operational characteristics of the node itself (e.g., CPU load, memory usage, latency). Runtime metrics may be collected from each node and grouped into clusters using a clustering scheme, such as density-based spatial clustering of applications with noise (DBSCAN). If a node is an outlier, as indicated as not being part of a cluster, its outlier status may be stored by the management system for future analysis.

Once the monitoring data (e.g., reachability data, code version data, and run metrics clustering data) is received the management system can determine a correlation between the monitoring data. In some embodiments, if each type of monitoring data indicates a given node is having issues, the node is identified as having issues and corrective actions can be issued to fix the issues. In some embodiments, one type of monitoring data (e.g., code version data) may be more heavily weighted than the other types such that if the more heavily weighted monitoring data indicates a node is having an issue, the node is identified as having an issue.

To this effect, in some embodiments, a method for correcting issues in a computer system may include receiving node data (e.g., monitoring data) from a group of nodes, the node data describing one or more operational characteristics of a node; generating reachability data for the group of nodes, the reachability data identifying whether the node is reachable; generating code version data for the group of nodes, the code version data identifying a version of code for one or more applications running on the node; generating cluster data for the group of nodes, the cluster data identifying one or more clusters of nodes in the group of nodes; determining a correspondence between the reachability data, the code version data, and the cluster data for the node; and/or based at least in part on the correspondence, issuing a corrective action command for the node.

In some embodiments, the reachability data is generated by attempting to communicate with the node using at least one of the following: pinging the node, telnetting the node, or checking load balance data for the node. In some embodiments, the reachability data is generated by attempting to communicate with the node in a sequence, which may include pinging the node, followed by telnetting the node, or followed by checking load balance data for the node. In some embodiments, the code version data is generated by querying a database that may include entries for what the code versions are for the one or more applications at the time the one or more applications were deployed.

In some embodiments, the cluster data generated in a process may include plotting each node of the group of nodes in an n-dimensional space according to the one or more operational characteristics for each node, determining distances between the group of nodes, identifying a neighborhood radius parameter, identifying one or more core nodes using the neighborhood radius parameter, or identifying an outlier node based on whether the outlier node is not connected to a path connecting the one or more core nodes.

In some embodiments, the one or more core nodes may be respective cores for the one or more clusters. In some embodiments, the corrective action command is issued if the correspondence indicates agreement between the reachability data, the code version data, and the cluster data for the node. In some embodiments, the agreement between the reachability data, the code version data, and the cluster data for the node. In some embodiments, the corrective action command is to do at least one of: send an electronic message to an administrator of the group of nodes, replace a VM for the node, or replace the one or more applications.

FIG. 1 is a network diagram depicting a client-server system 100, within which one example embodiment may be deployed. A networked system 102, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more nodes 118, which may be implemented as physical host servers, virtual machines, or containerized computing entities (e.g., Linux containers, operating-system level virtualization). The one or more nodes 118 may host one or more cloud systems 120 and computer node adaptive corrective system (C-NACS) applications 122. The cloud systems 120 may be implemented as hardware and/or software that provides web services over a network such as the Internet. The C-NACS applications manage the cloud applications by requesting operational characteristics and other data from the nodes. The operational characteristics may describe data about how the node is performing, as discussed in further detail below. The one or more nodes 118 are, in turn, shown to be coupled to one or more database servers 124 that facilitate access to one or more databases 126.

The cloud systems 120 provide a number of functions and services to users who access the networked system 102. While the cloud systems 120 and the C-NACS 122 are shown in FIG. 1 to both form part of the networked system 102, it will be appreciated that, in alternative embodiments, the C-NACS 122 may form part of a monitoring system and corrective system that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various cloud systems 120 and C-NACS 122 could also be implemented as standalone software programs, which do not necessarily have networking capabilities.

The web client 106 accesses the cloud systems 120 and the C-NACS applications via the web interface supported by the web server 116. Similarly, the programmatic client 108 accesses the various services and functions provided by the cloud systems 120 and the C-NACS applications via the programmatic interface provided by the API server 114. The programmatic client 108 may, for example, have executable code to monitor and issue corrective actions to the C-NACS application from a remote site that is remote from networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
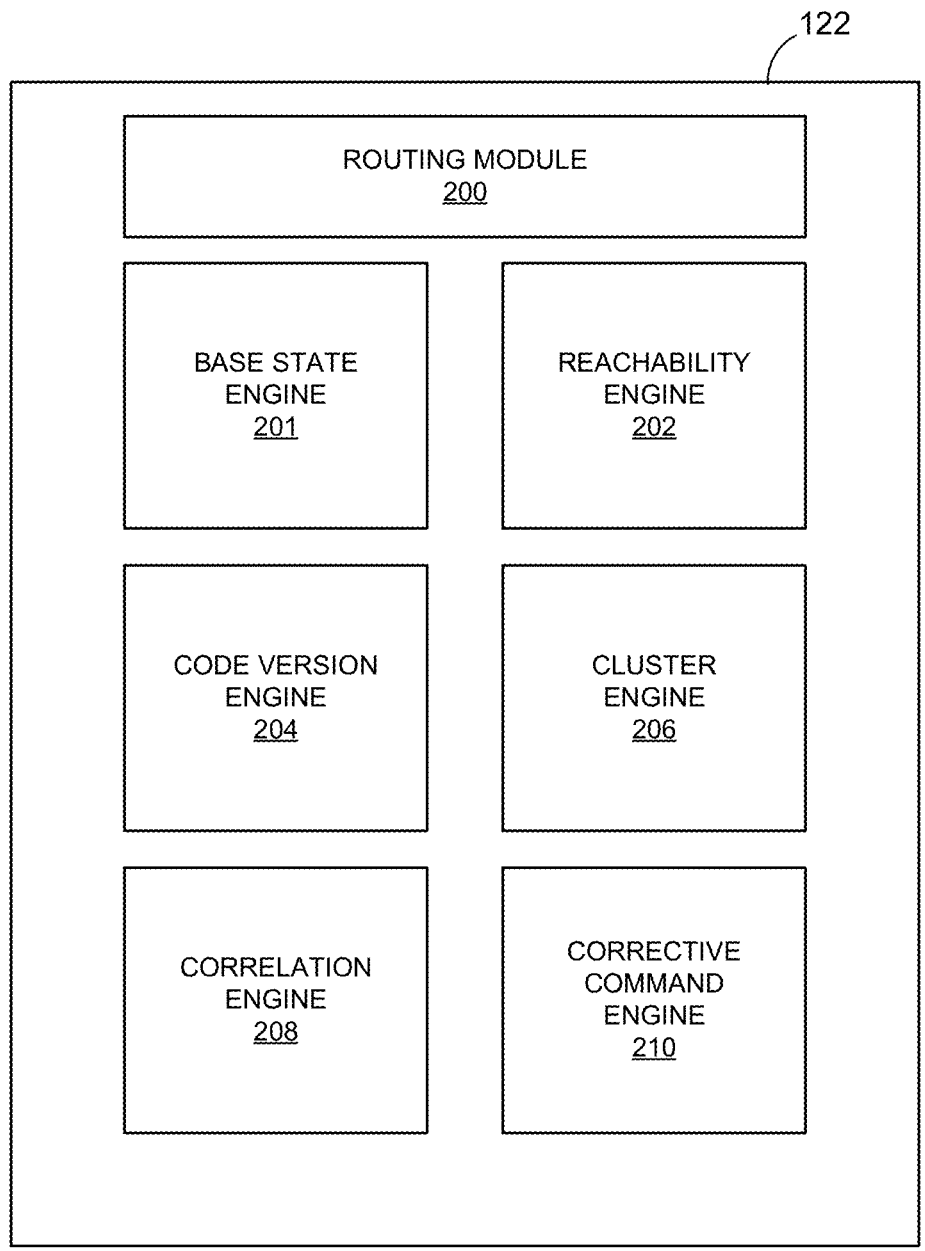
FIG. 2 illustrates a block diagram showing components provided within the networked system, as according to some embodiments.

FIG. 2 illustrates a block diagram showing components provided within the C-NACS application(s) 122, as according to some embodiments. The C-NACS application(s) 122 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of monitoring and analysis mechanics that allow the C-NACS 122 to analyze node data and generate corrective actions. To this end, the C-NACS 122 may comprise a routing module 200 that receives node data and routes it to different modules for analysis. Though a routing module 200 is illustrated in FIG. 2, in some embodiments, such as those illustrated in FIG. 5A-5C, each type of node data may be retrieved by a agent configured to retrieve a type of node data (e.g., a reachability agent configured to retrieve reachability data) and each agent may convey each type of node data down a given pipeline for that type of node data.

In some embodiments, the C-NACS 122 comprises at least one base state engine 201. The base state engine preprocesses difficult-to-qualify parameters of cloud applications into base state parameters that can be easier to monitor. As the cloud applications may conduct a myriad of tasks, different classes of cloud applications require different performance requirements to function properly. One set of performance requirements may be governed by service level agreements (SLAs). SLAs typically govern many different parameters per agreement, which can be difficult to monitor and correct dynamically as issues arise.

In some embodiments, the base state engine 201 first analyzes a given SLA agreement for the one or more applications and parses the SLA agreement into parameters of computer flavors common across different SLA types. For example, in one embodiment, the SLA agreement may be parsed into SLA parameters or compute flavors such as horizontal scaling level and response time limits (e.g., less than or equal to five milliseconds). The SLA parameters may also be extracted or identified from other components, such as a reachability engine 202 and or a cluster engine 206, as described in further detail below.

The C-NACS 122 may also comprise the reachability engine 202 which can use several techniques to identify whether a node is reachable (e.g., communicative, running, not-stalling). Reachability status of every node in a system can be used collectively as one of the parameters (e.g., SLA parameter) to determine quality of service (e.g., SLA). According to one embodiments, a node's reachability is determined using response results obtained from three utilities: ping, telnet, and load balancer check. By implementing several reachability techniques, the nodes reachability can be more correctly ascertained; as compared to determining reachability using only one of the techniques. For example, if a first node is isolated from the other nodes by a network border device (e.g., firewall), the first node may incorrectly ascertain that one of the other nodes is not reachable and hence down, when in fact the first node is isolated and the other nodes are up and running correctly. To avoid this error, the reachability engine 202 may use each of the three utilities in a cascaded fashion or sequence. For example, the first node may try to ping the node under consideration to see if the node is reachable. If the node returns a response ping, then the first node creates reachability data indicating that the node was pingable.

However, concluding a status of reachability using only the plain ping utility may not be reliable because there is a relatively high chance of the packets getting dropped along the way. Telnet is used as an added guarantee to the ping's result. As such, if the node under consideration did not return a response to the ping, then the first node can attempt to telnet the node. If the node responds to telnet, then the first node can create reachability data indicating the node under consideration is reachable.

However, if there is no telnet response, a false positive may still be possible. For example in an event of network partition, there is a fair chance the C-NACS on the node is quarantined from the rest of the nodes/servers. As a defensive check to avoid false positives, the result from a corresponding load balancer on each segment of the network is verified with a previous ping and telnet results. For example, assuming the node under consideration also does not return a response over telnet, the first node can then check with the load balancer to see whether the node is up and running. If the node balancer indicates that the node trying to be reached is up and running, then the first node can generate reachability data that the node trying to be reached is up and running but not contactable or reachable. From this, the first node can determine that it, itself, may be isolated from the other node trying to be reached and possibly other nodes. This result data can be used to determine issues at a correlation stage, as described in further detail below.

The C-NACS 122 may also comprise a code version engine 204, which according to some embodiments, identifies whether cloud systems 120 are running correct versions of code. A node may not be running the correct version of code, for example, where an anomalous error occurs on the node, and causes the applications to revert to older code versions. In some embodiments, the client/server system may be implemented as a distributed big data system, in which tasks are delegated to task processors (e.g., cloud applications) on each node, as occurs in Hadoop systems, for instance.

In some embodiments, a regular deployment job may be executed on n number of nodes, which updates a central database (e.g., code version database) with the active version of code that was deployed. The database may comprise entries that record what each code version should be for each application. The entries may be recorded upon deployment so that the database effectively keeps track of what code version is deployed. In this way, the code version central database may be used as a source of truth for the desired code version (e.g., What It Should Be—WISB). As mentioned, anomalies during a deployment job or other unexpected events can mutate an entire system or specific node in a system that has the actual code version (ground truth) running on the nodes (e.g., What It Really Is—WIRI). The difference between the WISB and WIRI for a given node can be used to determine whether any remediation is needed on the node.

The code version engine 204 may create a restriction requirement that WISB be equal to WIRI. The code version engine 204 identifies the difference between the WISB and WIRI for every node in a system and executes a code deployment with the correct version of code upon finding a difference.

The C-NACS 122 may further comprise the cluster engine 206 that is configured to cluster the nodes into groups or clusters to identify anomalous nodes as "outliers" (e.g., nodes that are acting out of the ordinary and may have errors). The cluster engine 206 may use runtime metrics or operational characteristics such as CPU load, memory use, or errors per second to map the nodes in an n-dimensional space, where each dimension corresponds to an operational characteristic. For example, one dimension may be CPU load, another may be memory use, and another may be errors per second.

In some embodiments, state changes happen unexpectedly before or after a system is provisioned and starts serving traffic. Runtime data from every node of a system including errors and latency numbers give information about the performance of the entire system. However, it is very difficult to determine an outlier in such a highly dynamic system. The runtime metrics analysis via the cluster engine can greatly improve outlier detection.

In some embodiments, the cluster engine 206 implements a density based data-clustering algorithm, such as the density-based spatial clustering of applications with noise (DBSCAN). Using DBSCAN, a set of points that correspond to operational characteristics of the cloud applications may be plotted in an n-dimensional space for clustering. In some embodiments, the DBSCAN scheme may be implemented as follows. A point p is a core point if at least some number of minimum points (e.g., minPT=5) are within a neighborhood radius (e.g., epsilon, ε) of p. The points in the neighborhood radius are said to be "directly reachable" from p. None of the points in a cluster are directly reachable from a non-core point. Furthermore, a point q is "density reachable" from p if there is a path $p_1, \ldots, p_n$ (with $p_1=p$, and $p_n=q$), where each $p_i+1$ is directly reachable from the immediately previous point $p_i$. In other words, all the points on the path must be core points, with the possible exception of q. However, all points not directly reachable by core points, nor density reachable, are identified as outliers.

Because applications deployed on nodes generally use similar operational parameters (e.g., same or similar CPU load level, for example), the density-based scanning can more easily identify outliers by analyzing the operational characteristics. For example, if a set of nodes typically run at 30% CPU load, the density-based scheme generates one or more clusters that have one dimension correlated to a CPU load level of 30%. In that case, a node running at 70% CPU load level may not be directly-reachable nor density-reachable, and thus identified as an outlier. Once the node is identified as an outlier node, clustering data may be generated identifying which nodes are in clusters (e.g., either as core points, or neighbors to core points) and which are outliers (e.g., neither directly nor density reachable).

Density-based clustering (e.g., density-based spatial clustering of applications with noise) offers several advantages over other clustering approaches, such as k-means clustering. Generally in the environment of FIG. 1, which may have myriads of nodes running myriads of applications, it is not known how many normal clusters will need to be analyzed for each metric. Density-based clustering works with the lack of information by finding a number of clusters starting from an estimated density distribution and then identifying a node that is too far from the cluster as an outlier. In this way, the process of outlier identification is more efficient; as opposed to k-means, which may need to run over multiple cycles to figure out all the clusters and identify outliers.

In some embodiments, the density-based scheme is executed for every node's individual variables, such as CPU usage, memory usage, and latency. The outliers marked from the previous step could then be acted upon to reinstate the node's virtual machine (VM) or applications running on the node (e.g., applications running from a physical server as a node). In some embodiments, the neighborhood radius value (e.g., epsilon) may be set dynamically by a machine or may be set or adjusted by a domain expert (e.g., a person with expertise in the area of applications being executed).

In some embodiments, errors may occur in density-based clustering when one or more outliers are identified as forming a cluster. To avoid these outlier-based clusters, the cluster engine 206 may first be trained on historical data to generate threshold value patterns that enable the cluster engine 206 to better identify clusters. The historical data may comprise past operational characteristics of nodes running a class of applications to be monitored.

The C-NACS 122 may further comprise a correlation engine 208 that analyzes the reachability data generated from the reachability engine 202, the code version data generated from the code version engine 204, and the cluster engine data generated from the cluster engine 206 to determine a correlation between the three datasets. In one embodiment, when all three datasets agree per a given node under analysis, the node is identified as having issues to be corrected. In one embodiments, the three datasets agree if the reachability data indicates that the node under consideration is not reachable, the code version data indicates that the node or applications in the node are running incorrect versions of code, and the cluster engine data indicates that the node is an outlier.

In some embodiments, the C-NACS 122 further comprises a corrective action command engine 210. The corrective action command engine 210 uses data identifying the node having issues (as generated by the correlation engine 208) to issue corrective action commands that correct the node's issues. Depending on the type of issue and the correlation between the three datasets, different corrective action commands may be issued. For example, where all three datasets indicate that a node is having issues, the corrective action command engine 210 may issue a corrective action command to replace the virtual machine (VM) image with a new VM image having the cloud applications with correct code versions. In these embodiments, the corrective command engine 210 can be configured with VM manager code that allows the corrective command engine 210 to take-down, restart, delete, and instantiate new virtual machines as needed. Though virtual machines are discussed here as an example, one of ordinary skill in the art appreciates that the corrective action command engine 210 can be further configured to replace or restart running applications in a node, as opposed to completely replacing a VM, for example.

Figure 3:
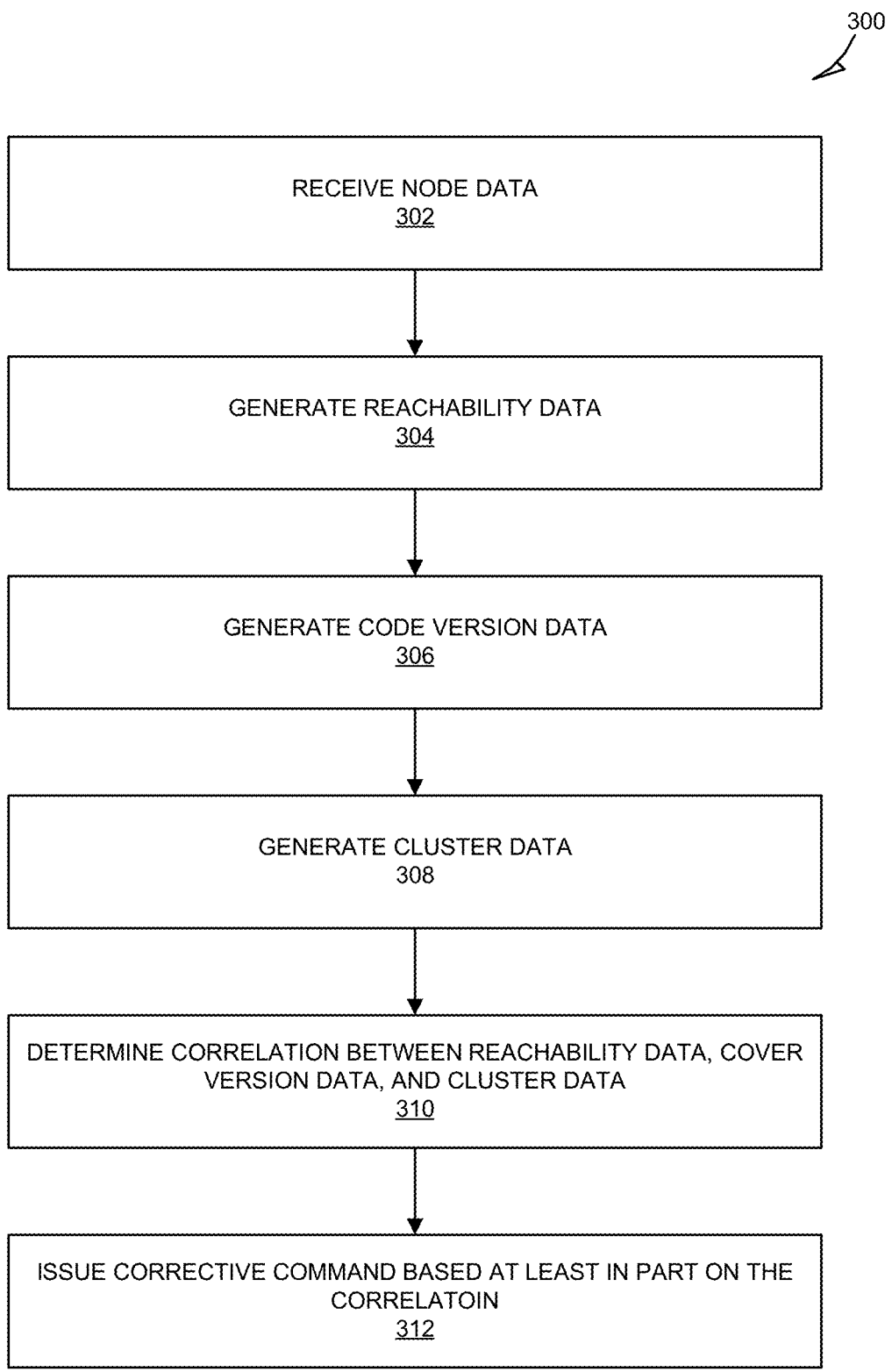
FIG. 3 shows a flowchart of a method for adaptively identifying and correcting issues on nodes in a computational system, as according to some embodiments.

FIG. 3 shows a flowchart of a method 300 for adaptively identifying and correcting issues on nodes in a computational system, as according to some embodiments. At operation 302, node data is received via an agent or via a router (e.g., routing module 200). The node data may comprise network data (e.g., delay time, response time/latency), node operational characteristics (e.g., CPU load, memory load, errors per second), and other data such as request errors and root transactions.

At operation 304, reachability data is generated by the reachability engine 202. The reachability data may be generated using different techniques such as trying to ping a node under consideration, telnet the node, or checking with a load balancer to determine application load distribution across the nodes (e.g., load across the node trying to ping the node under consideration, as well as load on other nodes of a cluster).

At operation 306, code version data is generated by the code version data 204. The code version data is generated by retrieving, from the nodes, the code versions of applications running on the nodes and comparing the code retrieved code versions with what they should be, as indicated in a code version database. The code version database may be queried as necessary to check the code versions.

At operation 308, cluster data is generated for the nodes by the cluster engine 206. The cluster data is generated by grouping the nodes into clusters using operational characteristics such as CPU load, memory load, or other parameters. For example, though CPU load and memory load may be common for one type of SLA, other types of SLAs may have different application specific operational parameters that may be used to cluster. In some embodiments, the clustering is completed using a density-based approach.

At operation 310, a correlation or correspondence between the generated datasets is determined by the cluster engine 206. For example, the correlation engine 208 ascertains whether, for a given node under consideration, the given node is (1) reachable, (2) running applications with correct code versions, and (3) not an outlier.

At operation 312, corrective commands are issued by the corrective command engine 210, the commands directed to one or more nodes to correct the issues of the one or more nodes. For example, in some embodiments, an issue may only affect one node, in which case the corrective action may be to correct the issue only on that node. In contrast, an issue may affect all nodes running applications of a certain class. In those cases, the corrective issue may be to find all nodes having the issue or running the identified problematic applications and restart, restore, or replace those applications. In some embodiments, the corrective action to be issued may depend at least in part on the correlation determined at operation 310. For example, where the datasets generated at operations 304, 306, and 308 all agree for a given node (e.g., that node is (1) not reachable, (2) running at least one incorrect version of code, (3) identified as an outlier in a cluster based approach), then that node or applications within that node may be restarted or restored. In some embodiments, where the identified correspondence is not in complete agreement (e.g., not reachable, running correct code versions, and not an outlier), no command action may be issued, or a minor command action may be issued. The type of command action issued for each type of correlation identified may be modified and adjusted per a domain expert, such as a node/application administrator with expertise in issue correction.

Figure 4:
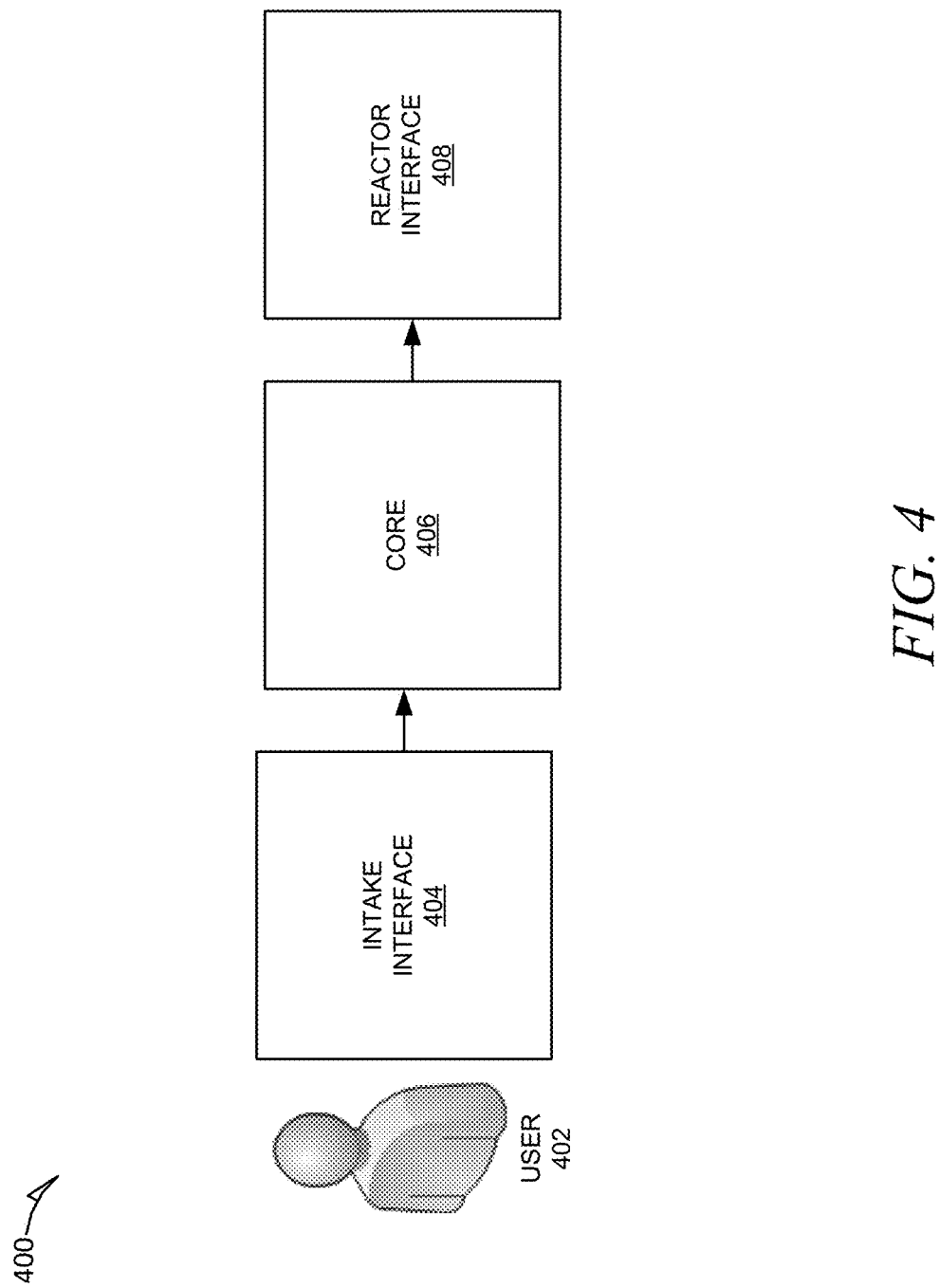
FIG. 4 illustrates an architecture configuration for the C-NACS mechanism, as according to some embodiments.

FIG. 4 illustrates an architecture configuration 400 for the C-NACS mechanism, as according to some embodiments. As illustrated the configuration 400 comprises three portions: an intake interface 404, a core 406, and a reactor interface 408. The intake interface 404 comprises a plurality of modules for collection and processing of node data from a collection of nodes. Data from the intake interface 404 is conveyed (e.g., transmitted, sent) to the core 406 for further processing. The core 406 comprises a plurality of modules for parsing the node data, identifying issues to be corrected, and issuing of correction action commands.

The data (e.g., correction commands) generated from the core 406 is conveyed to the reactor interface 408 for further processing. The reactor interface 408 comprises a plurality of modules that can interface with the plurality of nodes to perform corrective actions on the nodes (e.g., replacing/restarting VMs, applications).

A user 402 may be an administrator who modifies and configures the CNAC-S architecture. For example, the user 402 may configure the intake interface 404 by selecting signal agents for a given cluster of nodes or applications. Though the user 402 is shown interfacing with the intake interface 404, it is understood that the user 402 may setup, customize, or modify other components or portions of architecture 400 (e.g., the user may modify the clustering techniques in the core 406, or modify what types of correlations issue what types of action commands for the reactor interface 408 to perform). Further details, as according to some embodiments, of the architecture 400 are discussed in the following paragraphs with reference to FIGS. 5A-C.

Figure 5A:
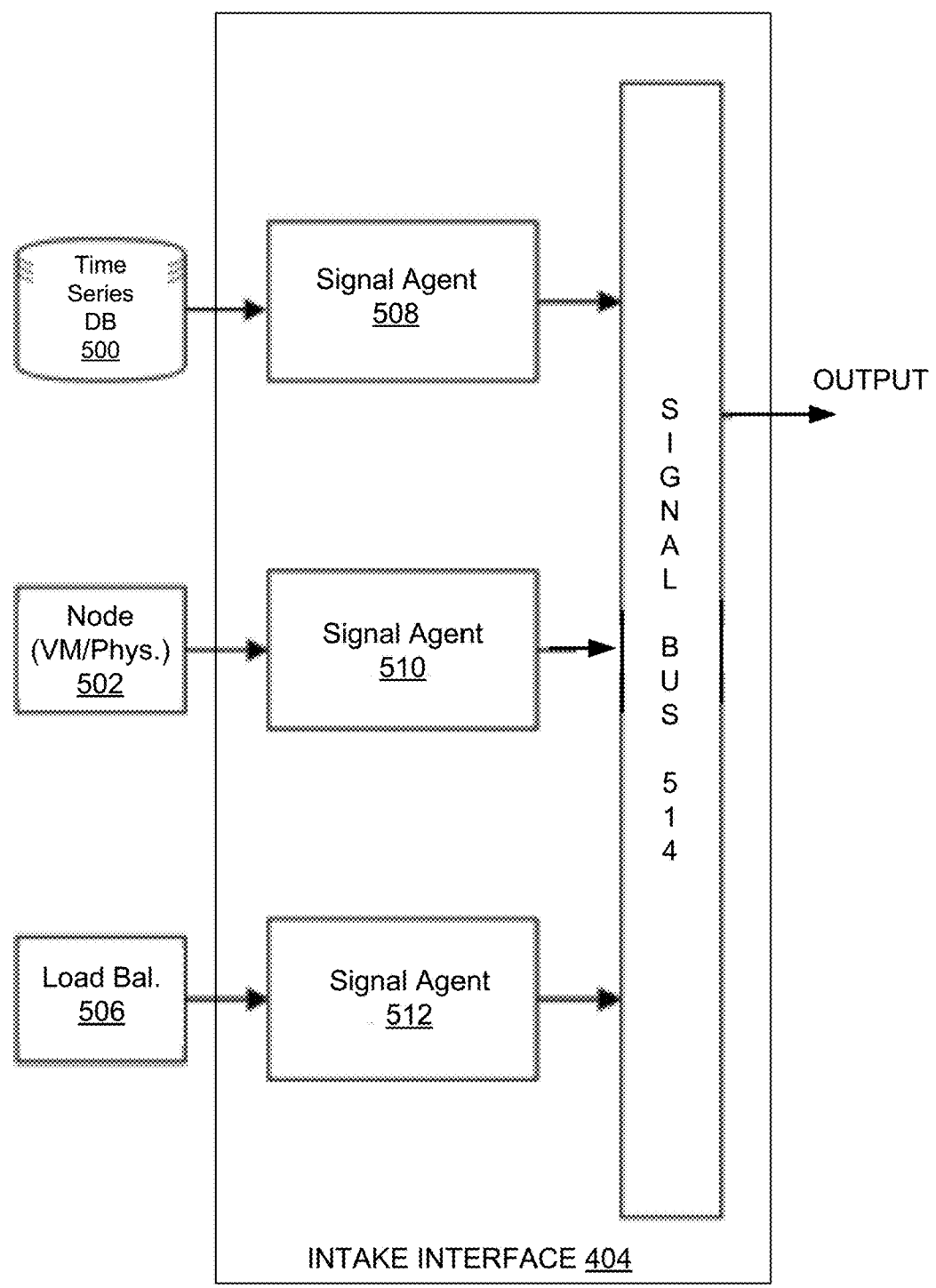
FIGS. 5A-5C illustrate internal components of the C-NACS mechanism, as according to some embodiments.

FIG. 5A shows internal components of the intake interface 404, as according to some embodiments. As illustrated, the intake interface 404 comprises a plurality of signal agents, 508, 510, and 512, which collect information from the plurality of nodes or applications running on or across the plurality of nodes. The data collected by the signaling agents 508, 510, and 512 may be processed or immediately conveyed to signal bus 514. Each signaling agent may be configured to retrieve particular types of node data from each node in a node cluster.

For example, the signal agent 508 may be a reachability signaling agent configured to ping or telnet all nodes in a cluster. Which nodes respond or do not respond may be recorded as reachability data and conveyed to the signal bus 514. As another example, a reachability agent may contact one or more databases, such as time series database 500, which may store information on how often an attempt to contact the node has been performed and the results of the attempted contact.

As another example, the signal agent 510 may be configured as a code version signaling agent that contacts each node 502 to retrieve data on which code versions of applications each node is running. Likewise, the signal agent 512 may be configured to interface with a load balance module 506 for the cluster of nodes to check what the application or processing load is distributed across which nodes. The signal bus 514 may be implemented as a messaging bus, such as Apache Kafka, to convey node data to the rest of the C-CNACS system. In one embodiment, the signal bus 514 outputs node data from the agents to core 406.

Figure 5B:
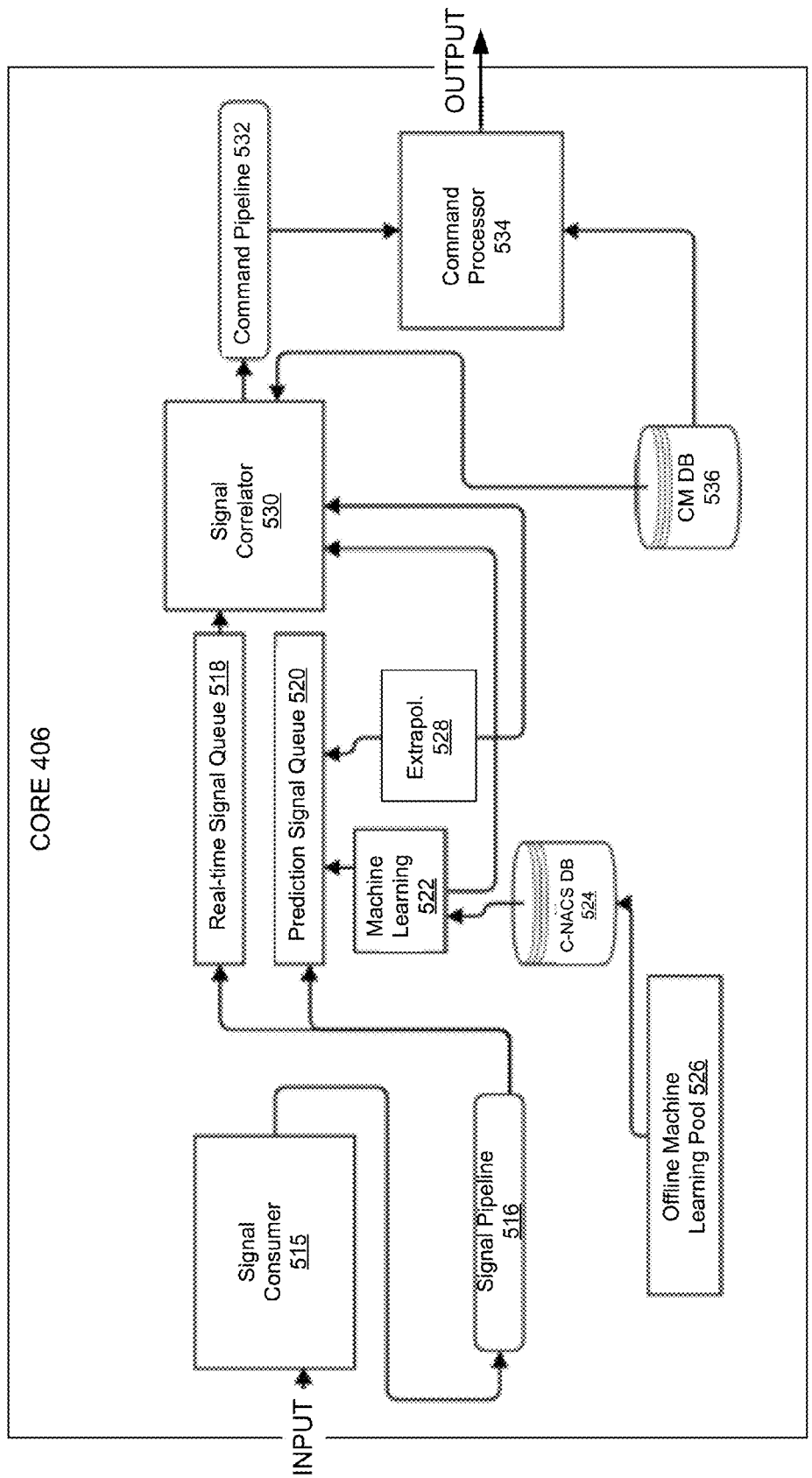

FIG. 5B shows internal components of the core 406, according to some embodiments. In one embodiment, data output from intake interface 404 is input into one or more signal consumers 515. The one or more signal consumers 515 convey node data into a signal pipeline 516. The signal pipeline 516 further conveys node data into different queues, such as a real-time signal queue 518 and a prediction signal queue 520.

The real-time signal queue 518 places real-time node data to be processed in queue to be processed for analysis of actually collected node data, which can be used to detect issues as they arise. In contrast, the prediction signal queue 520 receives node data from the signal pipeline 516 and use a machine learning module 522 or extrapolation module 528 to try to predict issues before they arise.

The machine learning module 522 may implement an ensemble model that trains a model using historical data for previously identified node issues. For example, per a given application pool, there may be past historical data that captured node data as past errors happened to the application pool. The application pool data comprising the past error data may be stored in an offline machine learning pool 526. The machine learning module 522 may select or load past pool data into a C-NACS database (DB) 524 for training. The training helps the model avoid DBSCAN created clusters that may form around outliers. In some embodiments, the machine learning module 522 also directly interfaces with a signal processor 530 to help avoid outlier created clusters.

The extrapolation module 528 analyzes node data in the prediction signal queue 520 and applies one or more fitting (e.g., polynomial fitting), regression (e.g., linear regression), interpolation, or schemes to determine whether the examined node data is likely to have issues in the future. In one embodiment, the extrapolation module 528 uses a regression scheme to try to fit the best possible curve for the recently collected node data values, for the past recent time window. The recency or past span of time may be implemented as an adjustable sliding window (e.g., regression fit over the past hour of data collected). The extrapolated values for the immediate next window may then be identified, within a margin of error, to predict node issues before they occur.

In some embodiments, the extrapolation module 528 may implement a feed-forward or collection of feed-forward networks (e.g., using the Java Encog library) to detect issues before they arise. For example, runtime metrics may train a collection of feed-forward networks for the past four years collected from the plurality of nodes. The training data may be partitioned into four networks of data to create four feed-forward networks: a first set may correspond to "hour of the day," a second set may correspond to "day of the week," a third set may correspond to "day of the month," and fourth set may correspond to "month of the year." Every network is given a time series data upon which it is trained to predict the possible value of each metric in the next window (for each network, respectively). The predicted value from each feed-forward network may be used together to check for possible threshold violations as defined in the core systems and the preventive actions are generated accordingly.

The signal correlator 530 processes node data of different signal types and determine a correspondence between the signal datasets, as explained above. In some embodiments, for a given node under consideration, the required correlation is that all datasets must agree; that is, for example, reachability, code version, and cluster outlier, must agree for an issue to be identified for the node. In some embodiments, different levels of correlation may be sufficient to identify an issue within a node. The signal correlator 530 may interface with a correction action command interface to determine what type of command should be issued in response to a correlation identified in the signal correlator 530.

As discussed above, a user 402 may be a domain expert (e.g., payment application server expert) that has expert knowledge. The user 402 can adjust the correlations between datasets, such that different correlations may trigger different commands. For example, if the user 402 from experience knows that any code version difference is sufficient to warrant a complete VM replacement, the user 402 can link the that level of correlation (e.g., code version dispositive, regardless of reachability and outlier identification) in the command (CM) database 536. The CM database 536, may in some embodiments identify the following as issues (e.g., correlations): (1) a machine (e.g., VM, node, operating system virtualized containerized application) may not be unreachable, (2) a machine is determined to have incorrect code version, (3) a machine may be identified as an outlier, (4) the parity of the pool may be anomalous. The following corrective actions may be linked in the CM database 536 as the correct actions to issue in response to any of the above correlations: (1) email administrators so they are aware of the issue, then automatically reboot the VM/node, or replace the VM/node, (2) email administrators, deploy applications with correct versions of code (where, for example, incorrect code versions were found to be running within a node), (3) restart a web-service on the node, or reboot the VM/node if issue not correct, (4) ensure the number of machines (nodes) matches number of machines that should be running as indicated in a CMS (e.g., as a response to a pool parity error). For example, the CM database 536 may receive data indicating that a node is not an outlier nor is it running incorrect code versions, but the node is unreachable. The CM database 536 may comprise an entry in a table linking the above data (correct code version, not an outlier, but is unreachable) to a command to restart the applications. The number of restarts may be tracked via counter in the CM database 536. In some embodiments, where the number of restarts surpasses a counter threshold, the application or node is replaced instead of restarted.

In some embodiments, the corrective action command data can be conveyed to one or more command pipelines 532 which further pass to command processors, which may be both configured to handle commands of certain types (e.g., restart commands, replace commands). As illustrated, the command processor may also interface with the command database 536 to receive inputs at that stage (at the command processor 534), in the case where the signal correlator merely identifies/determines correlation but not corresponding corrective action commands. The command processor 534 may issue the corrective action commands as output data to other portions of the C-NACS, such as the reactor interface 408, discussed below.

Figure 5C:
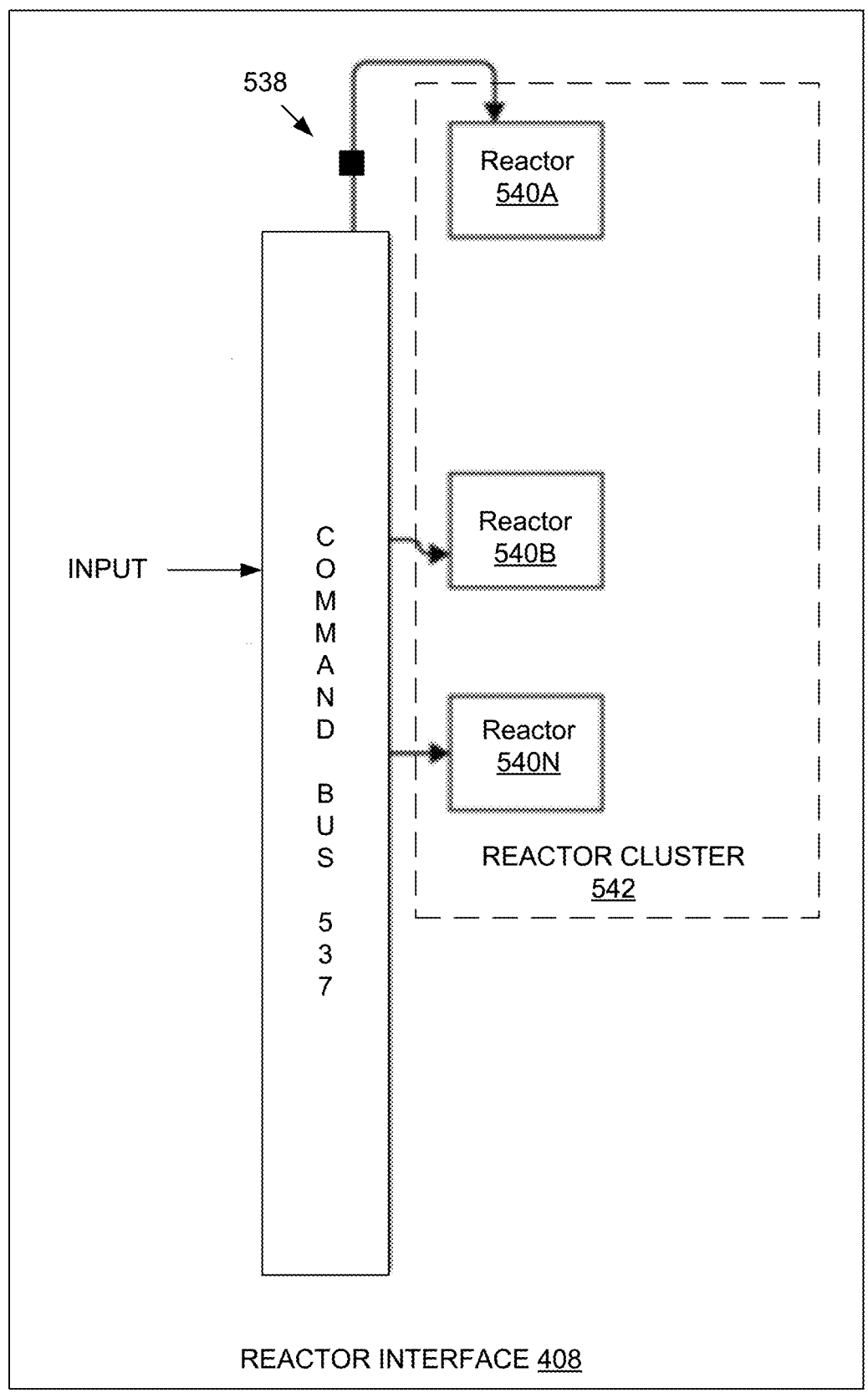

FIG. 5C shows internal components of the reactor interface 408, as according to some embodiments. The corrective action commands issued from the core 406 (see FIG. 5B) may be received as input into the reactor interface 408. The input is conveyed into a command bus 537 which is configured to route corrective action commands of different types (e.g., replace, restart, email administrator) to different reactor cores, such as reactor cores 540A-N, which are illustrated within a reactor cluster 542. Each reactor core 540 is configured to perform particular corrective actions to correct issues in the nodes or applications with the nodes. For example, the command bus 537 identifies that a corrective action command 538 is to replace or store a VM on a node (e.g., a payment server VM). As such, the command bus 537 routes corrective action command 538 to the reactor 540A, which may comprise data and programmatic language capable of contacting the node and replacing the VM on the node (e.g., by using hypervisor command language, VM instantiation language). Other reactors can be similarly configured to correct different issues.

In some embodiments, the reactors 540A-N are configured with intelligence to carry out corrective actions in concert (e.g., distributed, parallel, and/or concurrently), in cascade, or may be otherwise configured to perform particular checks to ensure the corrective actions do not cause further issues and disruption. Systems focusing on remediation aspects need to make sure of not inducing further damage to an already ailing application.

In one embodiment, the C-NACS system may be configured so that only a given threshold number of nodes can be operated on at any given time. They may be done, for example, to ensure that a set number of machines are still operating and fulfilling network critical functions. For instance, consider a situation where six machines out of ten in a pool need a restart action (e.g., rebooting each machine) due to identified outliers in CPU usage. However, the identified six machines to be restarted may be serving considerable amount of business critical traffic, and bringing down more than 50% of machines in the pool even for a brief period of time may not be an option. As such, a threshold may be enforced such that, for a given pool (e.g., the six machines) more than 50% of them may be brought down at any one time. In this approach, the other identified nodes that are to be restarted but are not allowed to restart due to the threshold may be persisted for auditing purposes but dropped from execution. In this way, a corrective action command is executed in a way that its performance is ensured to be within its safety limits; the core system waits for another set of signals from the dropped set of machines to act upon with safety limits in place.

In some embodiments, checks to determine redundant jobs being executed on the same set of nodes may also be implemented. This may be done to identify and avoid errors that become redundant across redundant jobs. In one embodiment, the core may check an internal job database (e.g., a database internal to the core that comprises entries for pending jobs to be executed or applications to be run) to ensure that the frequency of jobs executed on the same set of machines is not beyond a highness threshold. If this check fails—that is, if a set of machines is running too many jobs frequently creating too high a load—, the command is persisted in the database, dropped, and a notification may be sent to node or C-NACS administrators. This approach effectively flags redundant errors for manual inspection and investigation by the administrators. Because if a same job is failing on the same set of machines often then the underlying problem needs to be investigated and administrators are notified with a history of actions. The processed command is then pushed back onto the messaging bus for the executors to act upon.

In some embodiments, mutual exclusion and atomicity are two safe guards that may be implemented to prevent concurrent activities from being executed on the same application. In one embodiment, before a reactor performs corrective actions on a node to be repaired, the reactor may check with the node to determine whether the node is already in the middle of another corrective action, such as a new application deployment, or application corrective action (e.g., restart, replace). In some embodiments, this process may be implemented by using distributed locks such that when a lock is in place for a given node by a given reactor (e.g., performing a first task), no other reactor core may perform a second task or corrective action on the node. In some embodiments, the locking mechanism is a database that is checked by the reactor before the reactor performance corrective actions. In some embodiments, the locking mechanism is implemented as a distributed database, for example, as NoSQL distributed database.

In some embodiments, the system or node is measured before and after a corrective action is implemented to ensure that the corrective action did not cause deleterious affects. For example, after executing a command for a system, a check may be triggered to measure the effects of the command by looking for signals in the next batch corresponding to the same system for which the command was issued. As such, the overall health of the system is measured before and after commands are executed over it. A warning alert may be raised if signals are observed even after the commands were executed. In some embodiments, the before or after measuring process may work in concert with the redundant jobs checker to stop a deleterious or harmful corrective action before the corrective action is again implemented.

In some embodiments, in order to prevent multiple failures at the same time during execution of generated commands, a strategy is applied by the core for each type of command issued. Considering a command that acts upon 10 nodes in a system, the nodes are split into 'x' number of groups with a specified number of nodes in each group. The specified command is executed in parallel for all the nodes in one group but the groups themselves are cascaded one after the other. The success rate for each group is measured and the execution of the subsequent group is triggered only if a certain success rate threshold is crossed on the previous group of nodes. This information may be used by the safety check components as well to decide their triggers during the execution flow. In this way, the system may "fail fast" by first applying a command, seeing if the command fixed the issue, and not applying the command to the rest if the command failed to correct the issue.

Figure 6:
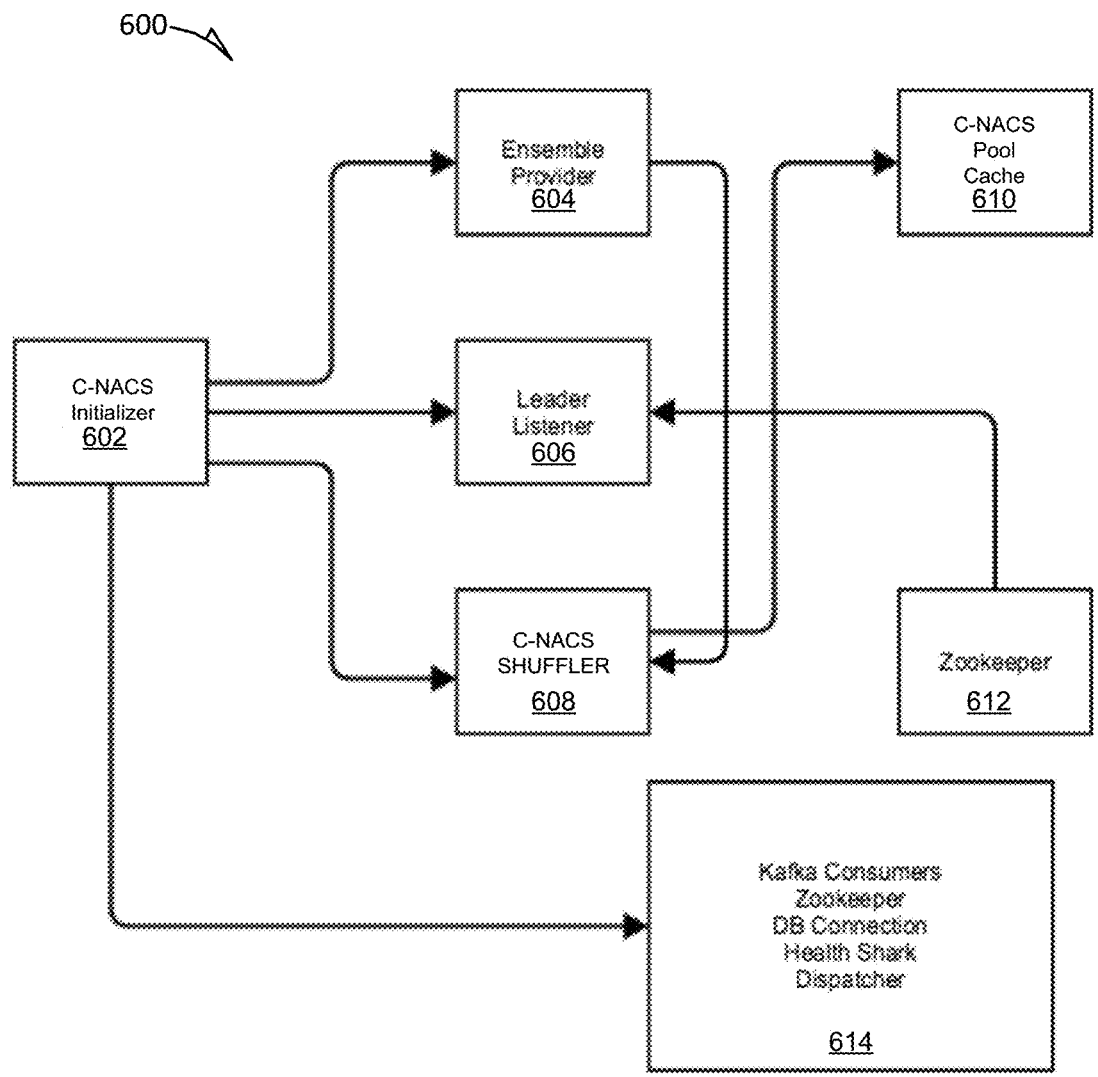
FIG. 6 illustrates components for deployment within each C-NACS application on each node, as according to some embodiments.

FIG. 6 illustrates components 600 for deployment within each C-NACS 122 on each node, as according to some embodiments. The approach illustrated in FIG. 6 allows the adaptive system to be operated in a robust distributed way that uses leaders and slaves to complete jobs. As illustrated, a C-NACS initializer 602 starts different components of the C-NACS system, including, for example, an ensemble provider module 604, a leader listener module 606 (on slaves), and a C-NACS shuffler module 608. In some embodiments, the NACS initializer 602 may further start other services and applications as required, such as those shown at 614 including Apache Kafka Consumers, Zookeeper, DB Connection, Health Shark, and Dispatcher.

In at least one embodiment, all C-NAC applications (e.g., running on C-NACS 122) on each node undergo an election in which one node is elected as leader. The non-elected nodes are designated as slaves and may use a leader listener 606 to listen for calls and communications from the leader node. As illustrated in some embodiments, the nodes may communicate with one another through Apache Zookeeper (e.g., Zookeeper module 612).

In at least one embodiment, when a leader is elected from the nodes, the leader initials a shuffler module 608 which distributes jobs or tasks to the other nodes. In some embodiments, jobs or tasks correspond to Hadoop tasks to complete MapReduce operations. In some embodiments, the ensemble provider module 604 is implemented, which may monitor all slaves and the elected leader. If the elected leader goes down or becomes unavailable, the ensemble provider module 604 triggers a new election and contacts the C-NACS shuffler module 608 to reshuffle jobs or tasks across the cluster of nodes. In some embodiments, each node may track which applications are in production or running in a pool cache, such as a C-NACS pool cache 610. Other modules, such as a code version signal agent may retrieve data from the pool cache 610 as needed to provide node data to the C-NACS core.

Thus, what has been described is an approach for adaptively identifying and correcting issues that arise in a cluster of nodes. The approach may retrieve reachability data, code version data, and density based clustering approaches for analysis. The correlation between the retrieved datasets may be analyzed and identified. Once identified, corrective actions for a problematic node or group of nodes may be issued. The approach disclose is robust as it can be deployed in a distributed environment, and is self-healing in that it can identify and correct issues on nodes without administrator intervention.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product (e.g., a computer program tangibly embodied in an information carrier, in a machine-readable medium for execution by, or to control the operation of, data processing apparatus, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
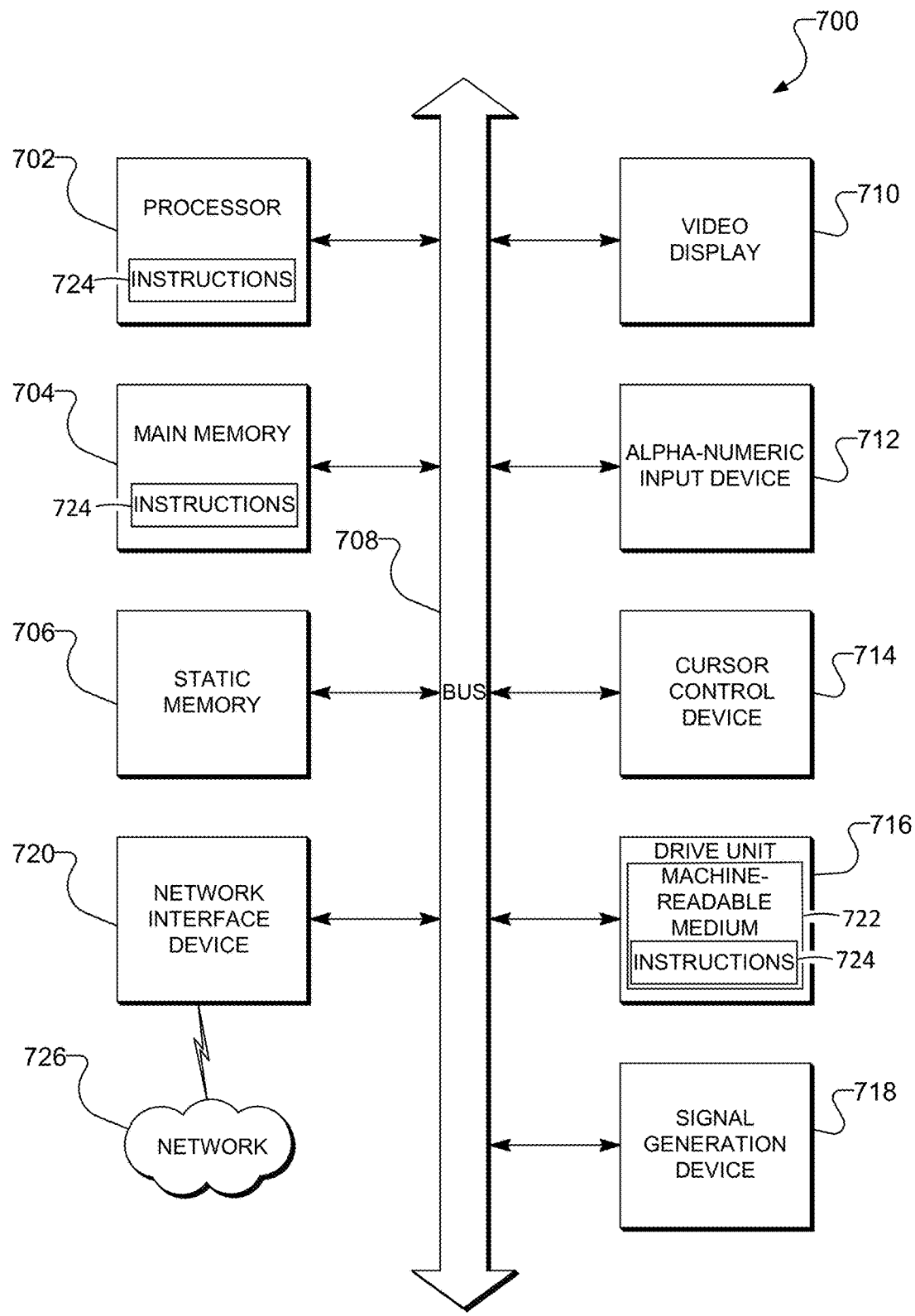
FIG. 7 shows a diagrammatic representation of a machine in the example form of a computer system within which a set of instructions may be executed to cause the machine to perform any one or more of the methodologies discussed herein, in accordance with some embodiments.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., Wi-Fi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A computer-implemented method for correcting issues in a computer system, comprising:
    receiving node data from a plurality of nodes, the node data describing one or more operational characteristics of each of the plurality of nodes, wherein the one or more operational characteristics include one or more particular operational characteristics of a particular node of the plurality of nodes;
    generating reachability data for the plurality of nodes, the reachability data indicating communication responsiveness of the particular node;
    generating code version data for the plurality of nodes, the code version data identifying a version of code for one or more applications running on the particular node;
    generating cluster data for the plurality of nodes based on the node data, the cluster data identifying one or more clusters of nodes in the plurality of nodes according to the one or more operational characteristics included in the node data; and
    issuing a particular corrective action command from a plurality of corrective action commands for the particular node, wherein the particular corrective action is based on a particular configuration combination of each of the reachability data, the code version data, and the cluster data with respect to operational performance of the particular node, wherein:
        the plurality of corrective action commands includes a first command and a second command;
        the first command corresponds to a first configuration combination that indicates agreement between the reachability data, the code version data, and the cluster data in which each of the reachability data, the code version data, and the cluster data indicate negative operational performance of a respective node;
        the second command corresponds to a second configuration combination that indicates disagreement between the reachability data, the code version data, and the cluster data in which one or more of the reachability data, the code version data, and the cluster data indicate positive operational performance of the respective node while one or more of the reachability data, the code version data, and the cluster data indicate negative operational performance of the respective node; and
        the particular corrective action command is the first command or the second command based on whether the particular configuration combination is the first configuration combination or the second configuration combination, respectively.

2. The computer-implemented method of claim 1, wherein generating the reachability data comprises attempting to communicate with the particular node using at least one of the following: pinging the particular node, telnetting the particular node, or checking load balance data for the particular node.

3. The computer-implemented method of claim 1, wherein the generating the reachability data comprises attempting to communicate with the particular node in a sequence comprising: pinging the particular node, followed by telnetting the particular node, and followed by checking load balance data for the particular node.

4. The computer-implemented method of claim 1, wherein generating the code version data comprises querying a database that comprises entries for what the code versions are for the one or more applications at the time the one or more applications were deployed.

5. The computer-implemented method of claim 1, wherein the generating the cluster data comprises:
    plotting each node of the plurality of nodes in an n-dimensional space according to the one or more operational characteristics for each node;
    determining distances between the plurality of nodes;
    identifying a neighborhood radius parameter;
    identifying one or more core nodes using the neighborhood radius parameter, the one or more core nodes being respective cores for the one or more clusters; and
    identifying an outlier node based on whether the outlier node is not connected to a path connecting the one or more core nodes.

6. The computer-implemented method of claim 1, wherein the first configuration combination includes the reachability data indicating that the respective node is not reachable, the code version data indicating that the respective node comprises incorrect version code, and the cluster data indicating that the respective node is an outlier from the other nodes with respect to the one or more operational characteristics.

7. The computer-implemented method of claim 1, wherein the particular corrective action command is to do at least one of: send an electronic message to an administrator of the plurality of nodes, replace a VM for the particular node, or replace the one or more applications.

8. A system for correcting issues in a computer system, the system comprising:
    a processor; and
    a memory storing instructions that, in response to being executed by the processor, configure the system to at least:
        receive node data from a plurality of nodes, the node data describing one or more operational characteristics of each of the plurality of nodes, wherein the one or more operational characteristics include one or more operational characteristics of a particular node of the plurality of nodes;

generate reachability data for the plurality of nodes, the reachability data indicating communication responsiveness of the particular node;

generate code version data for the plurality of nodes, the code version data identifying a version of code for one or more applications running on the particular node;

generate cluster data for the plurality of nodes based on the node data, the cluster data identifying one or more clusters of nodes in the plurality of nodes according to the one or more operational characteristics included in the node data; and issue a corrective action command for the particular node that is based on a particular configuration combination of the reachability data, the code version data, and the cluster data that indicates agreement between the reachability data, the code version data, and the cluster data in which each of the reachability data, the code version data, and the cluster data indicate negative operational performance of a respective node.

9. The system of claim 8, wherein the reachability data is generated by attempting to communicate with the particular node using at least one of the following: ping the particular node, telnetting the particular node, or check load balance data for the particular node.

10. The system of claim 8, wherein the reachability data is generated by attempting to communicate with the particular node in a sequence comprising: ping the particular node, followed by telnetting the particular node, and followed by checking load balance data for the particular node.

11. The system of claim 8, wherein the cluster data is generated by the system performing operations comprising:
plotting each node of the plurality of nodes in an n-dimensional space according to the one or more operational characteristics for each node;
determining distances between the plurality of nodes;
identifying a neighborhood radius parameter;
identifying one or more core nodes using the neighborhood radius parameter, the one or more core nodes being respective cores for the one or more clusters; and
identifying an outlier node based on whether the outlier node is not connected to a path connecting the one or more core nodes.

12. The system of claim 8, wherein the particular configuration combination includes the reachability data indicating that the particular node is not reachable, the code version data indicating that the particular node comprises incorrect version code, and the cluster data indicating that the particular node is an outlier from the other nodes with respect to the one or more operational characteristics.

13. The system of claim 8, wherein the corrective action command is to do at least one of: send an electronic message to an administrator of the plurality of nodes, replace a VM for the particular node, or replace the one or more applications.

14. A non-transitory machine-readable medium for correcting issues in a computer system, the machine-readable storage medium including instructions that in response to being executed by one or more processors of a machine, cause the machine to perform operations comprising:
receiving node data from a plurality of nodes, the node data describing one or more operational characteristics of each of the plurality of nodes including one or more operational characteristics of a particular node of the plurality of nodes;

generating reachability data for the plurality of nodes, the reachability data indicating communication responsiveness of the particular node;

generating code version data for the plurality of nodes, the code version data identifying a version of code for one or more applications running on the particular node;

generating cluster data for the plurality of nodes based on the node data, the cluster data identifying one or more clusters of nodes in the plurality of nodes according to the one or more operational characteristics included in the node data; and issuing a particular corrective action command from a plurality of corrective action commands for the particular node, wherein the particular corrective action command is based on a particular configuration combination of each of the reachability data, the code version data, and the cluster data with respect to operational performance of the particular node.

15. The non-transitory machine-readable medium of claim 14, wherein the generating the reachability data comprises attempting to communicate with the particular node using at least one of the following: ping the particular node, telnetting the particular node, or check load balance data for the particular node.

16. The non-transitory machine-readable medium of claim 15, wherein the generating the reachability data comprises attempting to communicate with the particular node in a sequence comprising: ping the particular node, followed by telnetting the particular node, and followed by checking load balance data for the particular node.

17. The non-transitory machine-readable medium of claim 14, wherein the generating the cluster data comprises performing operations comprising:
plotting each node of the plurality of nodes in an n-dimensional space according to the one or more operational characteristics for each node;
determining distances between the plurality of nodes;
identifying a neighborhood radius parameter;
identifying one or more core nodes using the neighborhood radius parameter, the one or more core nodes being respective cores for the one or more clusters; and
identifying an outlier node based on whether the outlier node is not connected to a path connecting the one or more core nodes.

18. The non-transitory machine-readable medium of claim 14, wherein the corrective action command is based on the particular configuration combination of the reachability data, the code version data, and the cluster data indicating agreement between the reachability data, the code version data, and the cluster data in which each of the reachability data, the code version data, and the cluster data indicate negative operational performance of a respective node.

19. The non-transitory machine-readable medium of claim 18, wherein the particular configuration combination includes the reachability data indicating that the particular node is not reachable, the code version data indicating that the particular node comprises incorrect version code, and the cluster data indicating that the particular node is an outlier from the other nodes with respect to the one or more operational characteristics.

20. The non-transitory machine-readable medium of claim 14, wherein:
- the plurality of corrective action commands includes a first command and a second command;
- the first command corresponds to a first configuration combination that indicates agreement between the reachability data, the code version data, and the cluster data in which each of the reachability data, the code version data, and the cluster data indicate negative operational performance of a respective node;
- the second command corresponds to a second configuration combination that indicates disagreement between the reachability data, the code version data, and the cluster data in which one or more of the reachability data, the code version data, and the cluster data indicate positive operational performance of the respective node while one or more of the reachability data, the code version data, and the cluster data indicate negative operational performance of the respective node; and
- the particular corrective action command is the first command or the second command based on whether the particular configuration combination is the first configuration combination or the second configuration combination, respectively.

* * * * *